Patented Dec. 23, 1952

2,622,971

UNITED STATES PATENT OFFICE 2,622,971

AMINO PHENOLS AS RICH MIXTURE ADDITIVES

George H. Denison, Jr., San Rafael, Calif., assignor to California Research Corporation, San Francisco, Calif., a corporation of Delaware No Drawing. Application December 17, 1947, Serial No. 792,350

5 Claims. (Cl. 44—75)

This invention relates to spark ignition engine fuels; more particularly, to spark ignition engine fuels boiling in the gasoline boiling range and having improved antiknock characteristics under rich mixture conditions and to a method for preparing such fuels.

In an attempt to reach a higher level of power output of a gasoline engine before knocking occurs, it has become the practice to supercharge the engine. However, supercharging, as a means of increasing the power output before knocking, is limited, in that a given fuel can tolerate just so much supercharging, beyond which, excessive knocking occurs. By employing rich fuel-air mixtures, that is, a ratio of fuel to air greater than that required for complete combustion, a greater amount of supercharging can be tolerated, with a given fuel, than if a lean mixture is employed. But this expedient also has the limitations, in that when a certain richness is reached, the engine misfires and the power output drops off.

In an effort to increase the power output still further before knocking occurred, numerous antiknock agents have been added to the base fuel. Among such antiknock agents have been metal carbonyls (e. g., iron pentacarbonyl) and tetraethyl lead. Most important of the proposed additives has been tetraethyl lead. Such other agents as have been proposed are, for the most part, less effective than tetraethyl lead or are more expensive. Despite the advantages of tetraethyl lead, its use is disadvantageous owing to several factors, such as its toxicity and its tendency to deposit lead compounds in carburetors, manifolds, valves, cylinders or exhaust pipes.

A further method of trying to solve the problem of knocking has been the manufacture of special base fuels by cracking, by isomerization of straight chain to branched chain hydrocarbon and by alkylation of isoparaffins with olefins. Judicious blending of stocks so prepared with one another and/or with straight run distillates has also contributed to upgrading base fuels.

Even by combining the advantages of tetraethyl lead, superior base stocks, supercharging and rich mixtures, it is difficult to meet certain aviation power requirements, such as is necessary in take-off of heavily loaded aircraft. Also, the above-noted disadvantages inherent in the use of tetraethyl lead remain.

Fuels of the gasoline type have been rated heretofore generally by the CFR–ASTM–D357–43T method and the CFR–ASTM–D614–43T method, hereinafter designated as the "F–2" method and the "F–3" method, respectively. These methods have rated fuels dependably for lean mixture use; i. e., use under normal or cruising conditions, but they are not dependable for rating fuels for use in supercharged engines using rich mixtures, as in aircraft take-off and climbing. Under these latter conditions, many fuels that have been rated as 100 octane or better by the F–2 and the F–3 methods have proved to be inferior fuels under conditions of extreme power requirements where the engine is supercharged and a rich fuel-air mixture is used. Fuels are rated under rich mixture conditions by the CFR–AFD–F4–443 method (hereinafter called the "F–4" method). This method is described in a report by the Coordinating Research Council dated April 20, 1943, and entitled "CFR Supercharge Method of Test for Knock Characteristics of Aviation Fuels." This method, the description of which has been widely circulated and which is widely used, rates a fuel under conditions of supercharging and rich fuel-air mixtures, and it correlates well with full scale ratings of fuels, as in aircraft take-off and climbing. The engine employed is a single cylinder, liquid cooled, gasoline spark ignition engine; the cylinder is the same as that used in the F–2 method of rating fuels. Manifold fuel injection is employed; the engine is equipped for supercharge; the compression is 7:1, and the engine is operated at 1800 R. P. M., 375° F. jacket temperature, 225° F. air temperature and 45° spark advance BTC. Further details as to design and operation can be obtained from the above-mentioned report.

Ratings of the F–4 method are given herein in terms of octane number up to 100 octane and, above 100 octane, they are given as performance numbers and as equivalents of isooctane plus $n$-milliliters of tertraethyl lead per gallon of fuel, $n$ being a positive number usually of the order of 1 to 10. For convenience hereinafter, F–4 ratings will be referred to as so many octane units (e. g., 98 octane units) where the fuel rated is not more than the equivalent of pure isooctane (which has an octane number of 100) and where the fuel rated is more than the equivalent of pure isooctane as so many performance numbers, and as S+$n$ (e. g., S+1.0) where S stands for isooctane and $n$ for the number of milliliters of tetraethyl lead required to be added to isooctane to produce a fuel having the same F–4 value as the fuel rated. (The number of milliliters of tetraethyl lead, $ñ$, means $n$-milliliters of the compound $Pb(C_2H_5)_4$.)

The performance number is used to designate the relative knock limited power output of fuels having octane numbers above 100 when tested according to the F-4 procedure. Pure isooctane has an octane number of 100 and a performance number of 100. A fuel having a performance number of 150, for example, has a knock limited power output equal to 1.5 times that of a fuel having a performance number of 100 (e. g., pure isooctane).

It is an object of the present invention to provide antiknock agents for stable spark ignition engine fuels and to provide fuels containing antiknock agents, which agents are inexpensive, adequately soluble in gasoline and lack the disadvantages of tetraethyl lead.

It is a particular object of the present invention to provide a method of obtaining, and to provide stable aviation fuels having superior rich mixture ratings, without entirely relying upon the selection of base fuel and the use of large amounts of tetraethyl lead.

It is a further particular object of the invention to provide a gasoline type of fuel for aircraft engines which provides improved antiknock characteristics under conditions of supercharging and of rich fuel-air mixtures.

It is a further object of this invention to provide unleaded aviation fuels having high antiknock and especially high F-4 ratings.

These and other objects of the invention will be apparent from the following description and the appended claims.

It has been discovered that certain amino phenols are highly effective in improving the antiknock ratings, and especially F-4 rich mixture ratings, of a stable spark ignition engine fuel, even when used in very small amounts.

The amino phenols which have been found to be thus effective are N-methyl-p-amino phenol, N-methyl-o-amino phenol, and nuclear alkyl homologues of these amino phenols, containing one or more nuclear $C_1$ to $C_4$ (inclusive) alkyl substituents.

Amino phenols have been proposed heretofore as antioxidants and/or gum inhibitors for unstable gasolines, e. g., cracked stocks. Amino phenols are also used in very small amounts when added to spark ignition fuels as stabilizing agents. Their efficiency as antiknock agents, and especially as agents to improve rich mixture ratings, has been unknown. Their only previous utility, therefore, has been in connection with unstable fuels.

In accordance with the present invention, the above amino phenols (any one or any mixture of them) are incorporated in a stable base fuel, such as a straight run distillate, an alkylate (e. g., sulfuric acid or HF isoparaffin-olefin alkylate) or a blend of two or more of the above and other types of stable fuels. Most advantageously, a stable base fuel is employed boiling in the gasoline boiling range, that is, having an ASTM (D-86) distillation with an initial boiling point of about 100° F. and a final boiling point at 400° F. Furthermore, it is preferred that the stable base fuel be derived from petroleum (such as straight run distillate-sulfuric acid alkylate-isopentane blend), and has a clear (no lead or other antiknock additive present) CFR octane number not less than 80. Such base fuels may be prepared by blending of suitable stocks as exemplified in the examples below.

As used herein, a "stable base fuel" means a fuel in which relatively no gums or resinous products form upon standing, especially when standing in the sunlight.

In accordance with another embodiment of the invention, these amino phenols may be incorporated in any stable base fuel boiling in the gasoline boiling range; the base fuel being so chosen (and blending with tetraethyl lead, if necessary) as to provide a fuel having an octane rating (F-2 method) of preferably at least 100 octane number. This fuel is then further blended with an amino phenol of the class designated in quantities sufficient to produce a finished fuel having an F-4 rating not less than about S+1.5.

In addition to the amino phenols, other compounds may be added to the fuel; such agents being exemplified as cloud point depressants, ketones, alcohols, esters, aliphatic amines and other stabilizing agents.

Additional agents may be used to improve the octane numbers of the fuels; such agents may be used as tetraethyl lead, aromatic amines (e. g., phenylene-diamines), iron carbonyl and the like.

The amino phenols may be used in amounts sufficient to improve the antiknock value (the octane number) of the stable spark ignition engine fuel when used at conditions of rich fuel-air mixture; the amounts ranging from about .001% to 0.5% by weight based on the finished fuel.

Blending of the amino phenols and base fuels may be accomplished by mixing the phenol and the base fuel together with such heat and/or agitation as may be necessary. In certain instances it may be beneficial to add a solvent (e. g., ethyl alcohol, acetone) to the mixture.

The base fuels of this invention may be unleaded (no tetraethyl lead) or leaded. The unleaded fuels offer the advantage of improved antiknock ratings without the deleterious effects of tetraethyl lead. The leaded fuels are especially useful as premium grade rich mixture fuels. Thus, a fuel having a clear octane rating (F-2 method) of 80 may be taken as the base fuel. To illustrate the advantages of the amino phenols of this invention, tetraethyl lead (4 ml./gal.) may be added to the base fuel to raise the F-2 method octane number from 80 to at least 100; then an amino phenol (or a mixture of amino phenols) of the invention may be added in quantities (e. g., .01% by volume (based on final fuel) of N-methyl-p-amino phenol) sufficient to produce a finished fuel having an F-4 rating of S+1.0 or more.

The method of this invention obviates the disadvantages inherent in the use of large quantities of tetraethyl lead (e. g., the deposition of lead and lead oxides in carburetors, manifolds, valves, cylinders or exhaust pipes, and also the toxicity of lead).

The method of the invention is also more economical in that it is relatively expensive to use large quantities of tetraethyl lead in increasing the octane numbers of a fuel from 80 to 100 or more. (The cost per unit increase of F-4 rating is much more where tetraethyl lead alone is used than when tetraethyl lead and the amino phenol are used together.)

The following example will serve further to illustrate the practice and advantages of this invention.

EXAMPLE

Amino phenolic compounds of the invention were blended in a 100 octane aviation fuel composed as follows:

35 volume per cent isoparaffinic alkylate
7 volume per cent isopentane
58 volume per cent Midway California straight-run gasoline (composed essentially of naphthene and paraffin hydrocarbons and containing less than 5 volume per cent of aromatic hydrocarbons)

and containing 4 milliliters of tetraethyl lead (TEL) per gallon. The F-4 rich mixture rating of the base fuel was S+1.0 (performance number of 126) and the F-4 rich mixture ratings of these blends are tabulated below in the table.

Table

| Additive | Percent by Volume | F-4 Rich Ratings | | Improvement in F-4 Rich Ratings Due to Additive | |
|---|---|---|---|---|---|
| N-methyl-p-amino phenol | 0.02 | S+1.3 ml. TEL | 131 Perf. No | 0.3 ml. TEL | 5 Perf. No. |
| N-methyl-o-amino phenol | 0.09 | S+1.3 ml. TEL | 131 Perf. No | 0.3 ml. TEL | 5 Perf. No. |

I claim:

1. A spark ignition engine fuel comprising a substantially gum-free hydrocarbon fuel boiling in the gasoline boiling range and having an F-2 method octane rating not less than 100 numbers and containing 0.001 to 0.5% by weight of an additive which will improve the rich mixture anti-knock value of the fuel selected from the group consisting of N-methyl amino phenols and nuclear $C_1$ to $C_4$ alkyl homologs thereof.

2. A spark ignition engine fuel comprising a substantially gum-free hydrocarbon fuel boiling in the gasoline boiling range and having an F-2 method octane rating not less than 100 numbers and containing a small amount, sufficient substantially to improve the rich mixture anti-knock value of the fuel, of an N-methyl amino phenol.

3. A spark ignition engine fuel comprising a substantially gum-free hydrocarbon fuel boiling in the gasoline boiling range and having an F-2 method octane rating not less than 100 numbers and containing 0.001 to 0.5% by weight of an N-methyl amino phenol.

4. A spark ignition engine fuel comprising a substantially gum-free hydrocarbon fuel boiling in the gasoline boiling range and having an F-2 method octane rating not less than 100 numbers and containing 0.001 to 0.5% by weight of N-methyl-p-amino phenol.

5. A spark ignition engine fuel comprising a substantially gum-free hydrocarbon fuel boiling in the gasoline boiling range and having an F-2 method octane rating not less than 100 numbers and containing 0.001 to 0.5% by weight of N-methyl-o-amino phenol.

GEORGE H. DENISON, JR.

REFERENCES CITED

The following references are of record in the file of this patent:

UNITED STATES PATENTS

| Number | Name | Date |
|---|---|---|
| 2,004,560 | Wilson | June 11, 1935 |
| 2,023,385 | Story | Dec. 3, 1935 |
| 2,409,157 | Schulze et al. | Oct. 8, 1946 |
| 2,409,171 | De Verter | Oct. 8, 1946 |
| 2,445,360 | Miller | July 20, 1948 |